United States Patent
Luong et al.

(10) Patent No.: US 9,069,761 B2
(45) Date of Patent: Jun. 30, 2015

(54) SERVICE-AWARE DISTRIBUTED HASH TABLE ROUTING

(75) Inventors: Steven V. Luong, San Jose, CA (US); Manish Bhardwaj, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 13/480,647

(22) Filed: May 25, 2012

(65) Prior Publication Data

US 2013/0318222 A1  Nov. 28, 2013

(51) Int. Cl.
  *G06F 15/173* (2006.01)
  *G06F 17/30* (2006.01)
  *H04L 29/08* (2006.01)
  *H04L 29/06* (2006.01)

(52) U.S. Cl.
  CPC .............. *G06F 17/30* (2013.01); *H04L 67/10* (2013.01); *G06F 17/30628* (2013.01); *H04L 67/327* (2013.01); *H04L 69/24* (2013.01)

(58) Field of Classification Search
  CPC ..... H04L 12/42; H04L 12/422; H04L 12/427; H04L 12/4637; H04L 2012/5612
  USPC ................................. 709/223, 225, 229, 251
  See application file for complete search history.

(56) References Cited

U.S. PATENT DOCUMENTS

| | | | |
|---|---|---|---|
| 6,704,795 B1 * | 3/2004 | Fernando et al. ............. | 709/237 |
| 7,212,490 B1 | 5/2007 | Kao et al. | |
| 8,661,525 B2 * | 2/2014 | Yan et al. ........................ | 726/15 |
| 8,676,951 B2 * | 3/2014 | Shiga et al. .................... | 709/223 |
| 2006/0126642 A1 * | 6/2006 | Kojima et al. ........... | 370/395.52 |
| 2006/0212551 A1 | 9/2006 | Kao et al. | |
| 2007/0280132 A1 | 12/2007 | Oz et al. | |
| 2009/0006593 A1 * | 1/2009 | Cortes .......................... | 709/223 |
| 2009/0013256 A1 | 1/2009 | Friedman et al. | |
| 2009/0034419 A1 * | 2/2009 | Flammer et al. .............. | 370/238 |
| 2009/0192999 A1 * | 7/2009 | Wang ................................. | 707/3 |
| 2010/0293223 A1 | 11/2010 | Bhardwaj et al. | |
| 2011/0153634 A1 | 6/2011 | Chu et al. | |
| 2012/0042197 A1 * | 2/2012 | Peng et al. .................... | 714/4.12 |
| 2012/0221692 A1 * | 8/2012 | Steiner et al. ................. | 709/222 |

(Continued)

OTHER PUBLICATIONS

Duan, et al., "Proximity Neighbor Selection in Structured P2P Network", Computer and Information Technology, Proceedings of the 6th IEEE International Conference on Computer and Information Technology (CIT '06), Sep. 1, 2006, 6 pages, IEEE Computer Society.

(Continued)

*Primary Examiner* — Liangche A Wang
(74) *Attorney, Agent, or Firm* — Parker Ibrahim & Berg LLC; James M. Behmke; Stephen D. LeBarron

(57) ABSTRACT

In one embodiment, a node in a computer network joins a global ring associated with a distributed hash table (DHT), and maintains a DHT routing table and DHT database for the global ring. In addition, the node may determine a particular service class for which the node is configured, and may join a particular service-based sub-ring according to the particular service class, where all nodes of the particular service-based sub-ring are within the global ring. As such, a service-based DHT routing table and service-based DHT database may be maintained for the particular service-based sub-ring, such that DHT operations identified by the particular service class are routed to the particular service-based sub-ring (e.g., by a portal node).

20 Claims, 11 Drawing Sheets

(56) References Cited

U.S. PATENT DOCUMENTS

2013/0031229 A1* 1/2013 Shiga et al. .................. 709/223
2013/0235192 A1* 9/2013 Quinn et al. .................. 348/143

OTHER PUBLICATIONS

Finnie, et al., "Notification of Transmittal of the International Search Report and The Written Opinion of the International Searching Authority, or the Declaration", Patent Cooperation Treaty, International Appl. No. PCT/US2013/042626, mailed Aug. 9, 2013, European Patent Office, Rijswijk, Netherlands.

Mislove, et al., "Providing Administrative Control and Autonomy in Structured Peer-to-Peer Overlays", International Workshop on Peer-to-Peer Systems, Feb. 2004, 6 pages.

Shi, et al., "A Hierarchical Peer-to-Peer SIP System for Heterogeneous Overlays Interworking", Global Telecommunications Conference, Nov. 1, 2007, pp. 93-97, GLOBECOM, IEEE, Piscataway, NJ.

Xu, et al., "HIERAS: A DHT Based Hierarchical P2P Routing Algorithm", Proceedings of the 2003 International Conference on Parallel Processing (ICPP '03), Oct. 6, 2003, 8 pages, Piscataway, NJ.

Ganesan, et al., "Canon in G Major: Designing DHTs with Hierarchical Structure", 24th International Conference on Distributed Computing Systems (ICDCS 2004), Mar. 23-26, 2004, 10 pages.

Garcés-Erice, et al., "Hierarchical P2P Systems", In Proceedings of ACM/IFIP International Conference on Parallel and Distributed Computing (Euro-Par), Aug. 2003, 25 pages.

Karp, et al., "Spurring Adoption of DHTs with OpenHash, a Public DHT Service", Proceedings of the 3rd International Workshop on Peer-to-Peer Systems (IPTPS), Feb. 2004, 6 pages.

* cited by examiner

SERVICE-AWARE DISTRIBUTED HASH TABLE ROUTING

TECHNICAL FIELD

The present disclosure relates generally to computer networks, and, more particularly, to distributed hash tables (DHTs).

BACKGROUND

A Distributed Hash Table (DHT), as will be understood by those skilled in the art, is a decentralized, expandable, and fault-tolerant database system which is based on key-value pairs. Some well-known DHT protocols are Chord, Pastry, Kademlia, and P-Grid, which typically define the process for nodes to join an existing DHT network, build the DHT routing table, and use the DHT routing table to forward the PUT/GET messages to the root node of the objects. The Root node is typically defined as the node whose node identifier (ID) is closest to the object being stored (PUT) or retrieved (GET). The basic DHT protocols work very well for simple applications to store and retrieve objects based on a single key in DHT network. It should be noted that the key of the object is obtained by hashing a unique field in the object, and the root node of the object is strictly based on the result of the hash.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node in a computer network joins a global ring associated with a distributed hash table (DHT), and maintains a DHT routing table and DHT database for the global ring. In addition, the node may determine a particular service class for which the node is configured, and may join a particular service-based sub-ring according to the particular service class, where all nodes of the particular service-based sub-ring are within the global ring. As such, a service-based DHT routing table and service-based DHT database may be maintained for the particular service-based sub-ring, such that DHT operations identified by the particular service class are routed to the particular service-based sub-ring (e.g., by a portal node).

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
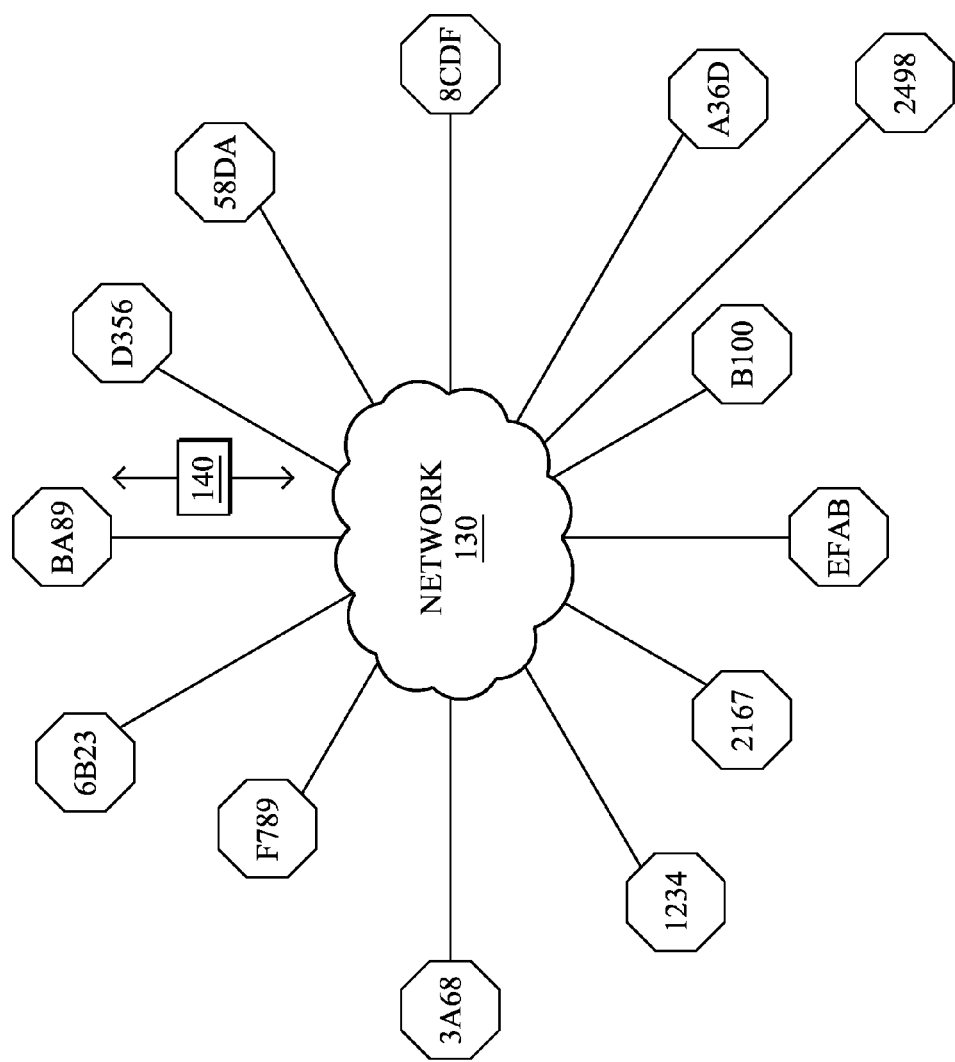
FIG. 1 illustrates an example computer network.

FIG. 1 is a schematic block diagram of an example simplified computer network 100 illustratively comprising nodes/devices 200 (e.g., labeled as shown, "1234", "3A68", "58DA", etc.) interconnected by various methods of communication, generally referenced as "network 130". For instance, the links may be wired links or shared media (e.g., wireless links) where certain nodes 200, such as, e.g., routers, sensors, computers, etc., may be in communication with other nodes 200, e.g., based on physical location, current operational status, etc. Data packets 140 may be exchanged among the nodes/devices of the computer network 100 using predefined network communication protocols such as certain known wired protocols, wireless protocols, etc., where appropriate. In this context, a protocol consists of a set of rules defining how the nodes interact with each other. Those skilled in the art will understand that any number of nodes, devices, links, etc. may be used in the computer network, and that the view shown herein is for simplicity.

Figure 2:
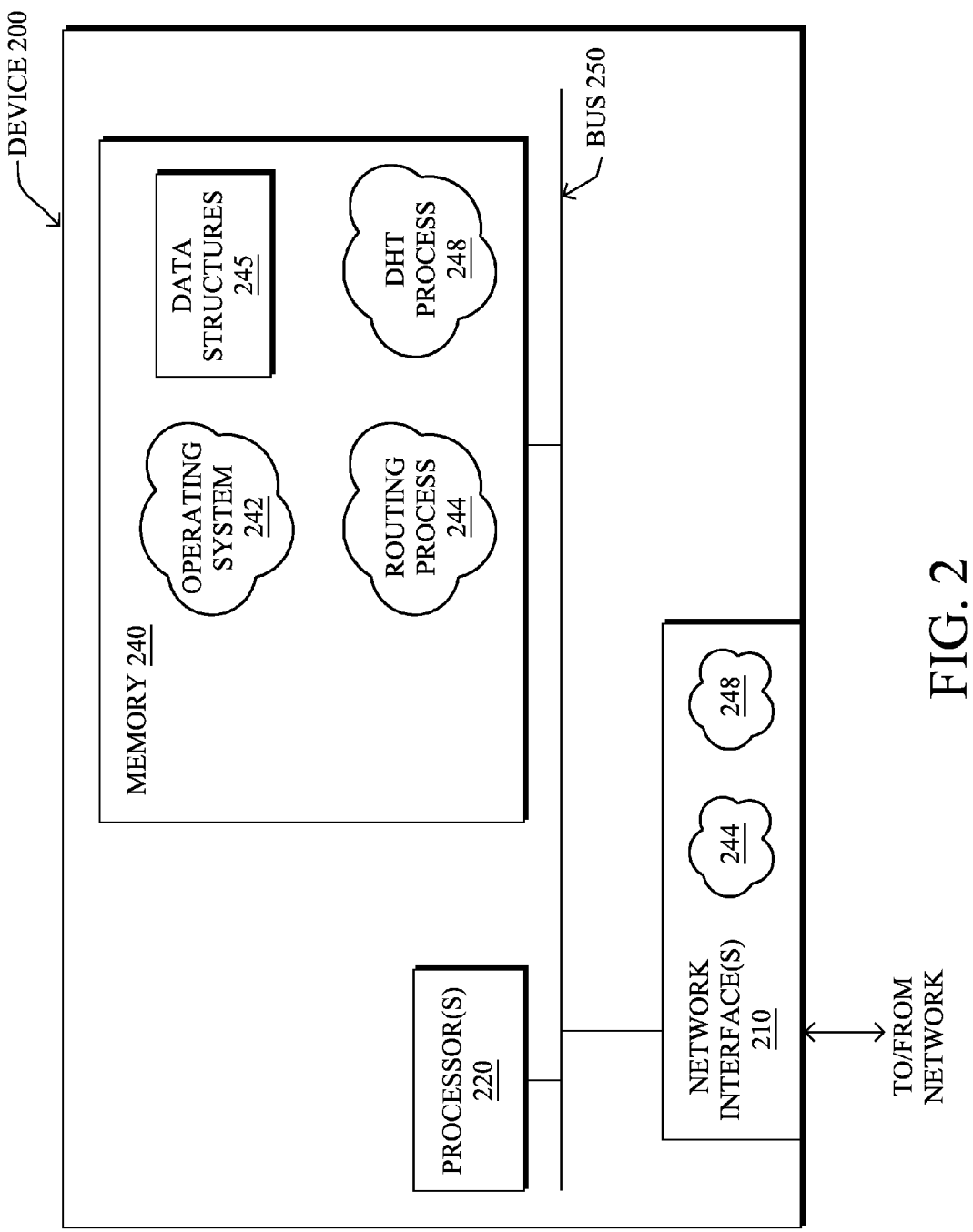
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 100. The network interfaces may be configured to transmit and/or receive data using one or more communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process 244 and an illustrative distributed hash table (DHT) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For instance, DHT process 248 may be a specific component of routing process 244. Still further, while processes 244 and 248 are shown in centralized memory 240, alternative embodiments provide for the processes to be specifically operated within the network interfaces 210.

Routing process 244 comprises computer executable instructions executed by the processor 220 to perform functions provided by one or more routing protocols, such as proactive or reactive routing protocols as will be understood by those skilled in the art. These functions may, on capable devices, be configured to manage one or more routing or forwarding tables (a data structure 245) containing, e.g., data used to make routing/forwarding decisions.

As noted above, a Distributed Hash Table (DHT) is a decentralized, expandable, and fault-tolerant database system which is based on key-value pairs. The basic DHT protocols work very well for simple applications to store and retrieve (PUT and GET) objects based on a single key in DHT network. It should be noted that the key of the object is obtained by hashing a unique field in the object, and the root node of the object is strictly based on the result of the hash. That is, to place an object into a node, a key of the object is used to determine a particular node in the network (participating in the DHT "ring") that corresponds to that hashed key.

Figure 3A:
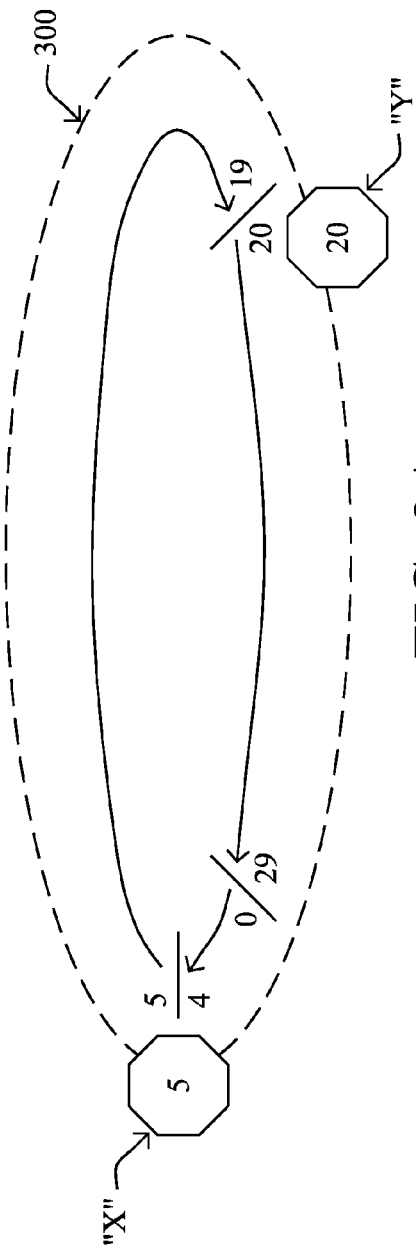
FIGS. 3A-3B illustrate an example of a simplified distributed hash table (DHT) ring.
Figure 3B:
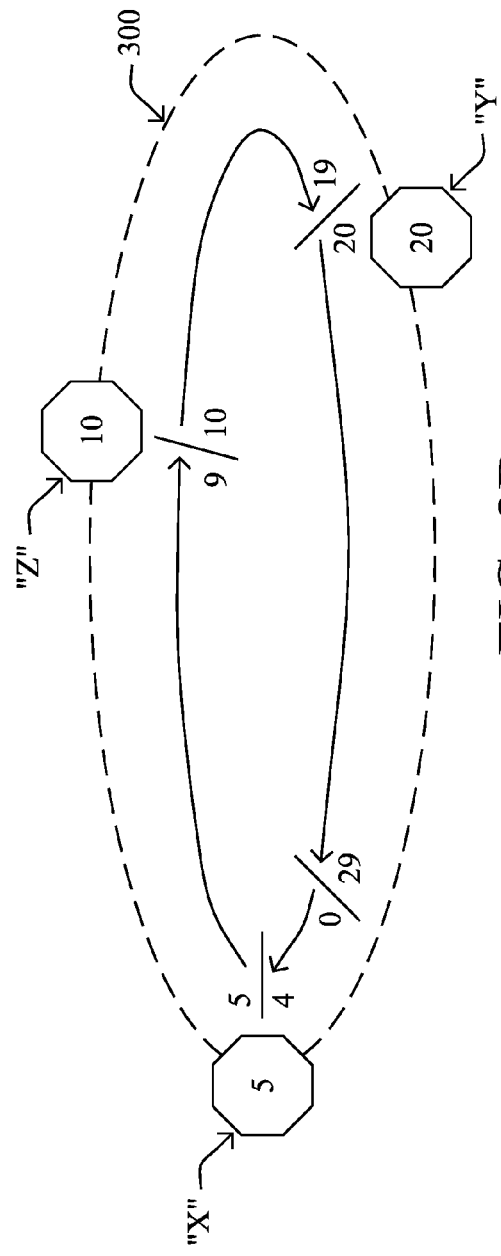

FIG. 3A illustrates an example simplified DHT ring 300, illustrating how each node has its own key space. In particular, to determine a node's key space for which the node is a "root node", an identifier (ID) of the node (e.g., a media access control (MAC) address, a node ID, etc.) is hashed to determine a particular "location" within a DHT (e.g., generally a number within a range of 2^128 or 2^256 numbers). As shown in FIG. 3A, for instance, assuming that a node "X" has a hashed ring value of "5", and node "Y" has a value of "20", then in a ring with locations from 0-29, node X is associated with key space from 5-19, and node Y is associated with key space from 20-29 and 0-4 (hence a "ring" structure). To place an object (e.g., a file, a data structure, etc.) into the network, the object is hashed (e.g., a unique field in the object) to associate it with a particular key (e.g., "12"), and then the associated PUT request is sent to the node corresponding to that key space (e.g., node X). To retrieve the object (GET), the requestor submits that same key (e.g., "12"), and the DHT ring 300 is used to determine which device corresponds to that key space (again, node X). As shown in FIG. 3B, when inserting a new node "Z" into the DHT ring 300, e.g., whose hashed ID corresponds to the value "10", the key space is divided accordingly, such that in the example, node X handles 5-9, node Z handles 10-19, and node Y handles 20-29 and 0-4. (Those skilled in the art will appreciate that there are many ways to organize a keyspace, and the organization shown and described herein is not meant to limit the scope of the embodiments of the disclosure.)

Notably, if the DHT network is geographically dispersed, as it generally is, an object may be stored physically far away from where the majority of the GETs originate, since every node in a DHT has the same probability of becoming the root node of any objects. There is no locality information used for the PUTs. Consequently, the GETs may be less than optimum. In order to reduce the latency for the GETs, it is highly desirable that objects are stored close to the nodes where the majority of the GETs originate. The basic DHT protocol also does not distinguish between objects and has no mechanism to provide different service-levels. For example, if the DHT ring is overloaded, there are currently no mechanisms that allow a PUT for an object with lower service-level to be rejected, while a PUT for an object with higher service-level is be accepted.

The techniques herein, therefore, provide a service-aware DHT system that seamlessly addresses the aforementioned issues. In particular, the techniques herein define a DHT system that allows objects to be stored by the node that it is most likely to be retrieved from by creating coherent service-based "sub-rings". For instance, an administrator (operator) may control the set of nodes to store each class of object, and through the configuration, service differentiation may be achieved. In this manner, a service-aware DHT technology is established which efficiently stores and locates objects by service type, taking, for example, locality, network, and hardware information into account. As described herein, each service level is managed by a separate DHT routing table, where a node may participate in multiple service levels, and one or more nodes form a DHT overlay to manage a service level as a particular service-based sub-ring (of a "global" ring in which each node of the DHT network participates).

Specifically, according to one or more embodiments of the disclosure as described in detail below, a node in a computer network joins a global ring associated with a DHT, and maintains a DHT routing table and DHT database for the global ring. In addition, the node may determine a particular service class for which the node is configured, and may join a particular service-based sub-ring according to the particular service class, where all nodes of the particular service-based sub-ring are within the global ring. As such, a service-based DHT routing table and service-based DHT database may be maintained for the particular service-based sub-ring, such that DHT operations identified by the particular service class are routed to the particular service-based sub-ring (e.g., by a portal node).

Illustratively, the techniques described herein may be performed by hardware, software, and/or firmware, such as in accordance with the DHT process 248, which may comprise computer executable instructions executed by the processor 220 to perform functions relating to the techniques described herein, e.g., in conjunction with routing process 244. For example, the techniques herein may be treated as extensions to conventional DHT protocols, and as such, may be processed by similar components understood in the art that execute those protocols, accordingly.

Operationally, rather than merely creating just one DHT ring (as does the classic DHT protocol), the techniques herein may create a plurality of coherent DHT sub-rings in addition to a global ring, where each DHT sub-ring is dedicated to handle one service class (i.e., a service-based sub-ring). All nodes must generally join the global ring (e.g., for keepalive optimization, described below), but each node may optionally join as many sub-rings as configured. As also described below, DHT operations, such as "PUT" and "GET", may be identified by a particular service class identifier, which allows the operation to be routed to the corresponding DHT sub-ring.

Figure 4:
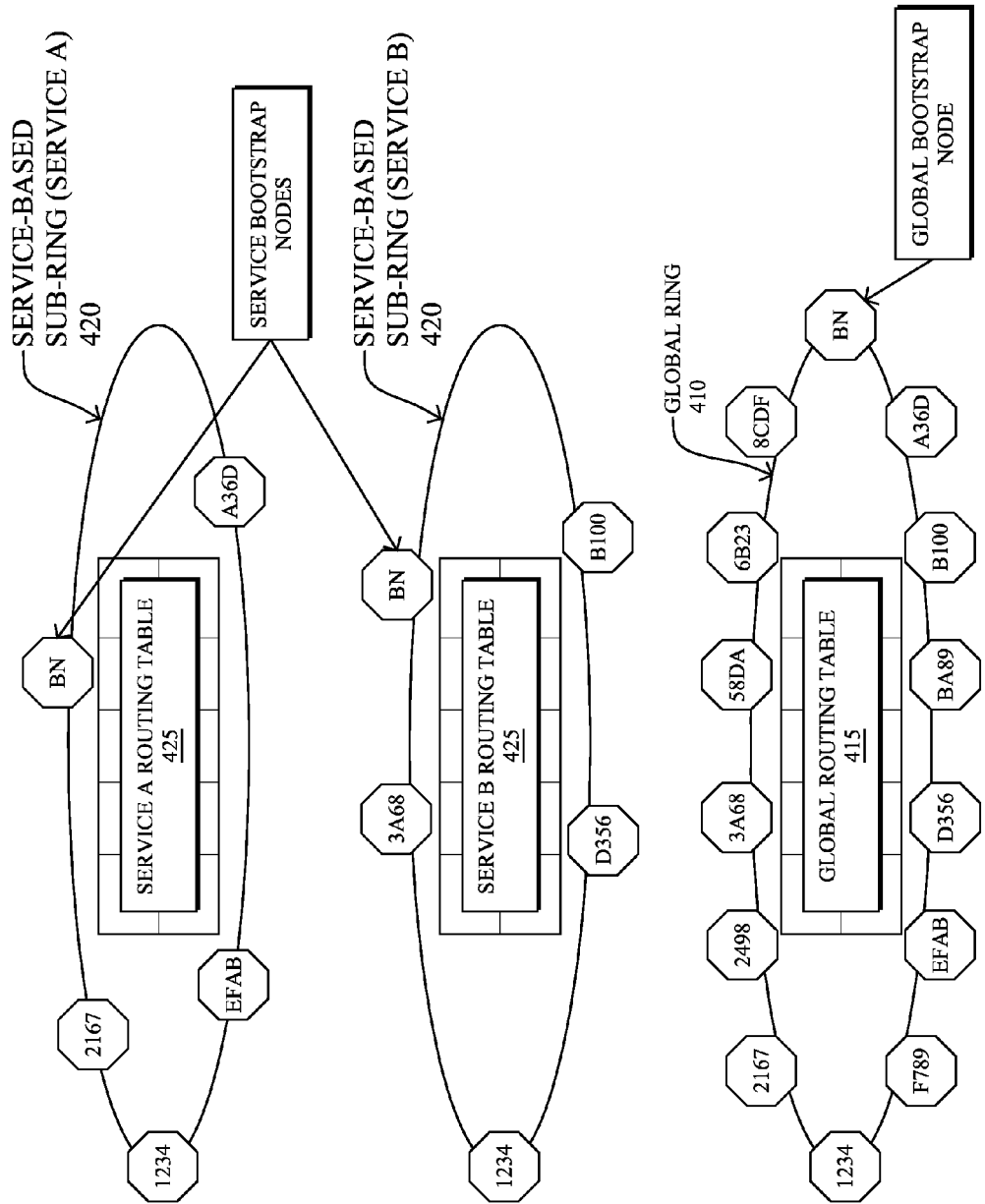
FIG. 4 illustrates an example of service-based DHT sub-rings.

FIG. 4 illustrates an example of service-based DHT sub-rings in accordance with an illustrative embodiment herein. In particular, as shown, a global ring 410 may comprise one or more nodes 200, such as the nodes shown in FIG. 1 above, where the global ring is established according to a DHT routing table 415 and DHT database in a generally conventional manner. Associated with the global ring 410, however, is any number of service-based sub-rings 420 (service "A" and service "B") having one or more nodes of the global ring. That is, each node of each service-based sub-ring (associated with the global ring) is within the global ring. For example, node "1234" is located within each of the sub-rings for service A and B, as well as the global ring. Node "2167", however, is only located in service A (and the global ring), while node "3A68" is located only in service B (and the global ring). Note that not every node within the global ring 410 need be located within any of the plurality of service-based sub-rings 420, such as node "2498". Also, there is a separate DHT routing table 425 and database associated for each sub-ring, in addition to the global ring's routing table 415 and database.

To configure service-based sub-rings, an operator or administrator creates service classes and maps the objects to the service classes which will be stored in the DHT sub-rings. In general, the administrator may allocate and identify the "best" DHT nodes to direct the PUTs and GETs for each service class object based on the probability of retrieval location, CPU of the nodes, disk capacity of the nodes, etc. In other words, the operator may determine one or more service class for which DHT nodes are configured, which may be based on service classes selected from node type, node capability, node location, node functionality, node applications (specific applications or types of applications operating on the node), etc.

Figure 5:
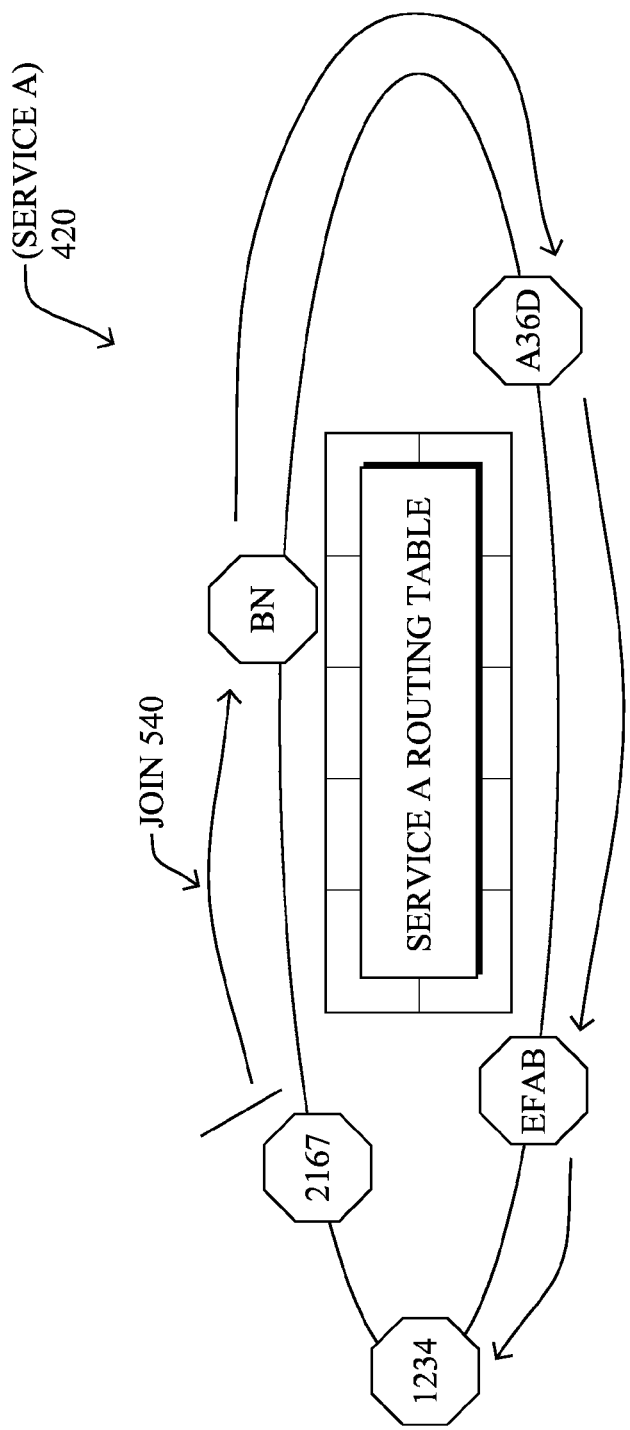
FIG. 5 illustrates an example of a join message in a service-based sub-ring.

In addition, the administrator (or an automated process) also identifies the bootstrap nodes ("BN") for each service class or sub-ring. In particular, all nodes must join the global ring via the Global Bootstrap Node and any service overlays via the corresponding service bootstrap nodes. FIG. 5 illustrates an example of a join message/procedure for service-based sub-rings in accordance with one or more embodiments herein. In particular, in addition to joining a global ring 410 of a DHT (and thus maintaining a DHT routing table 415 and DHT database for the global ring), certain nodes of the computer network 100 may also join one or more service-based sub-rings 420 according to their particular service class(es). To do so, the joining nodes send a Join message 540 to the bootstrap node (global BN and service BN), which routes the Join message to the root node of the key of the joining node.

For instance, for each service class that a new node is joining, e.g., node "2167" joining service A, the new node sends a Join message 540 to that particular service class's bootstrap node (BN). The bootstrap node for the corresponding service class will then route the Join message to the corresponding service class's root node, e.g., node "1234". While the Join message is routed (as will be understood by those skilled in the art), each node along the path must send the routing table to the joining node for the particular service class corresponding to "R" row number minus 1, where R is the row number which the new node will be inserted to the routing table of the forwarding node. With this scheme, by the time the Join message 540 is routed to the root node, the new node will have a full routing table 420 to participate routing for PUTs and GETs for the particular service class. In other words, the new node sends a Join message for all service classes/sub-rings in which it is participating, not just the global ring, and each Join message 540 is sent to the bootstrap node for the particular service class. (Note that it is not a requirement that the bootstrap node of a particular ring/sub-ring be a part of that ring/sub-ring.)

Figure 6:
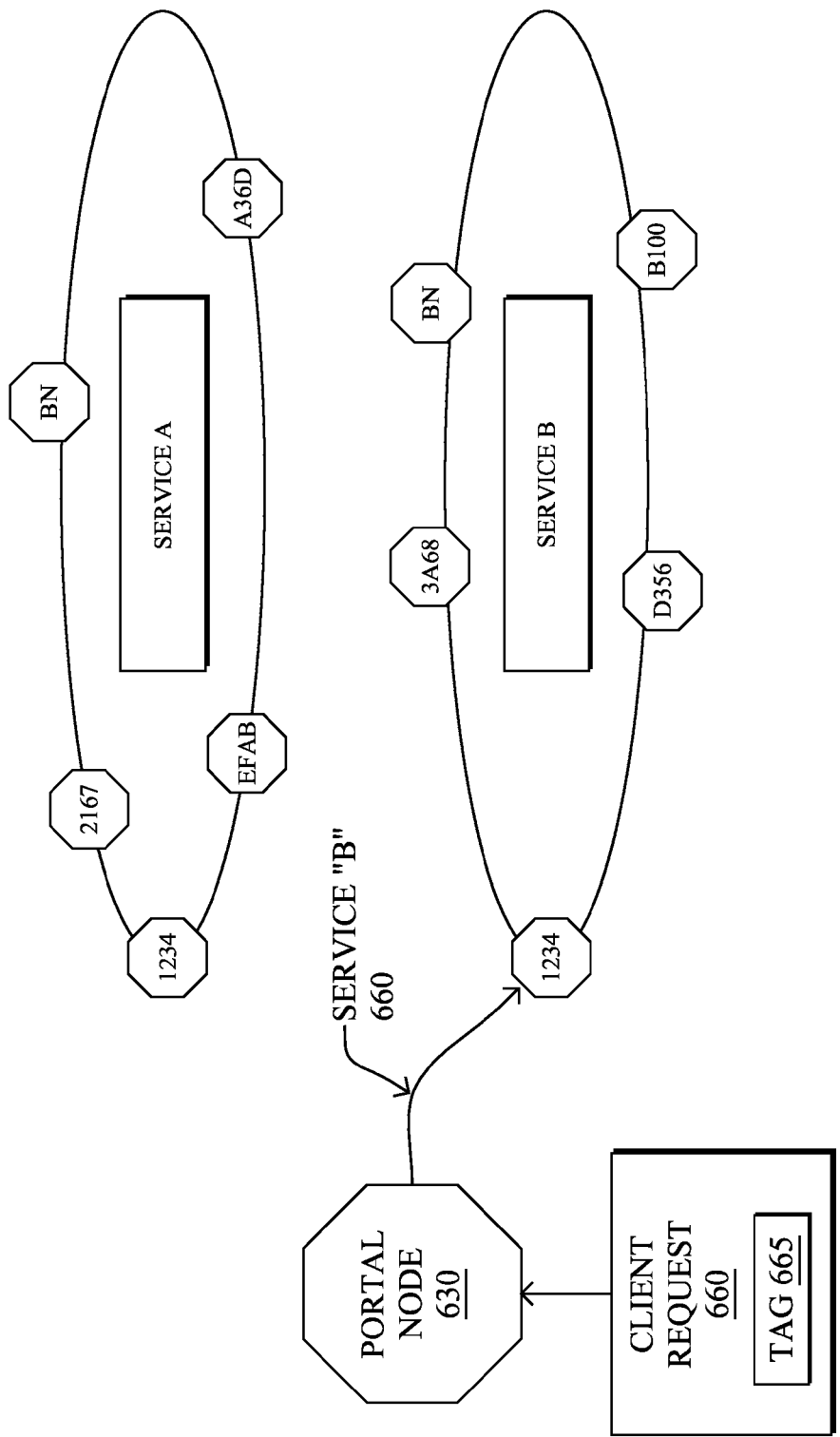
FIG. 6 illustrates an example of DHT operation based on services.

According to the techniques herein, DHT operations, such as PUTs and GETs, are identified by a particular service class, such that they may be appropriately routed to a particular service-based sub-ring 420 of a plurality of sub-rings. FIG. 6 illustrates an example of DHT operation based on services, where one or more client-facing portal nodes 630 receive DHT operation requests 660 (e.g., PUT/GET, PUB/SUB, etc.), and forwards the operation to the appropriate service overlay. That is, the portal node determines the identified service class of the request (tag 665, e.g., a service class number based on the object type), and routes the request to the a selected node of a particular service-based sub-ring (notably being aware of at least one member of each service-based sub-ring/overlay). The nodes of the sub-ring may then perform DHT mechanisms within that service-based sub-ring, accordingly. In this manner, the service class is used to determine which DHT routing table and nodes to perform the requested DHT operations, such as, for example, to store and retrieve the objects.

Figure 7:
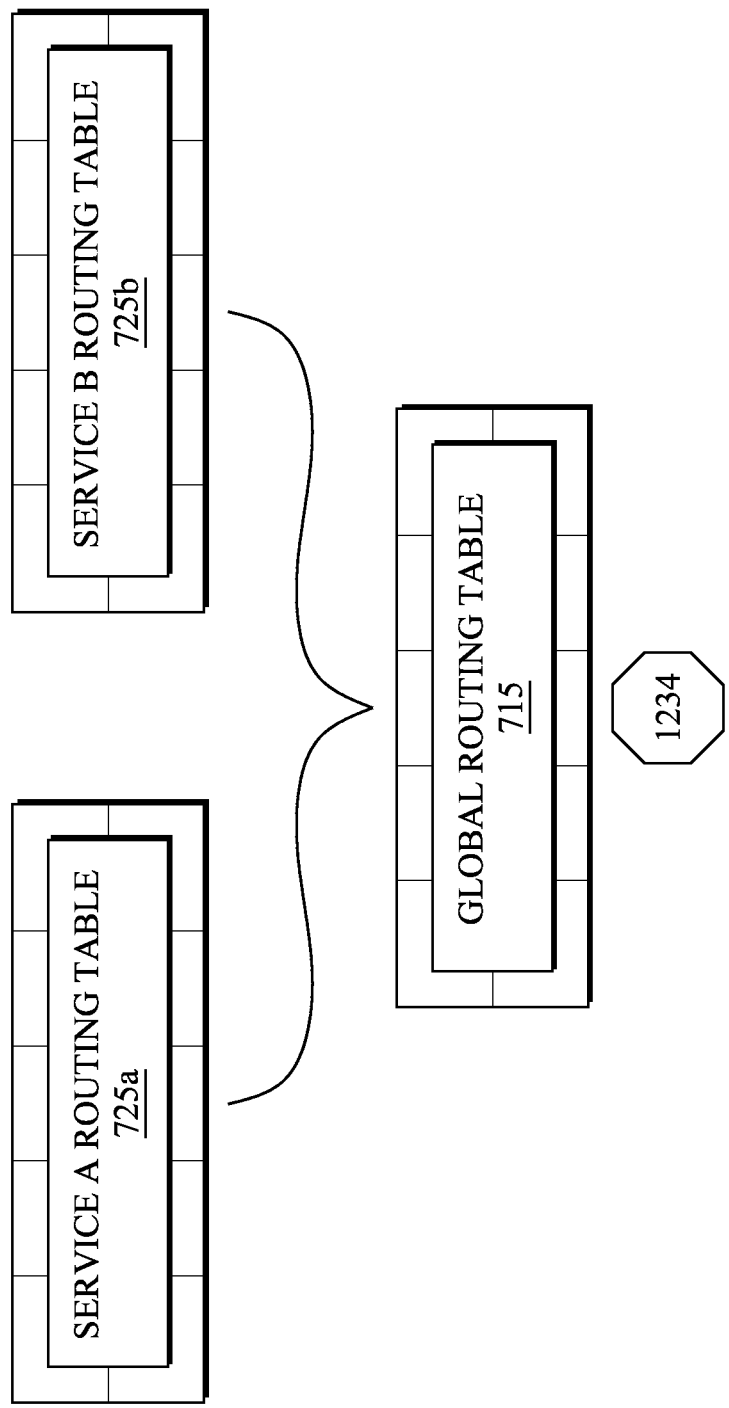
FIG. 7 illustrates an example of simplified service-based sub-ring routing tables.

Each node 200 maintains its own routing table (a data structure 245) for each ring and sub-ring to which it belongs. FIG. 7 illustrates an example of simplified service-based sub-ring routing tables, where a node (e.g., node "1234") maintains a separate service-based DHT routing table 420 and separate service-based DHT database for each of the plurality of service-based sub-rings, e.g., routing table 720a and 720b for service A and service B, respectively. Note that the storage of routing tables 720a and 720b are in addition to the global routing table 410 (710 in FIG. 7). In particular, service-based routing tables at a DHT node are subsets of the global routing table at that node, and are maintained by periodic polling and neighbor selection (e.g., proximity based). Each cell (entry) in the global routing table can therefore contain multiple neighbors for coverage of all services running on the DHT node.

DHT protocols generally use keepalives for liveliness and redundancy. As the service-based routing tables 425 (725) of the techniques herein are subsets of the global routing table 415 (715), in one or more embodiments herein, keepalives are exchanged only with neighbors in the global routing table. That is, the techniques herein maintain keepalive operations for each particular sub-ring based on keepalive messages exchanged within the global ring, notably providing greater efficiency than maintaining keepalives for each sub-ring. Notably, an optimization in the neighbor selection algorithm according to the techniques herein involves giving higher weight to neighbors that run multiple services. Optionally, this weight may be based on a trade-off with physical proximity of that neighbor.

Figure 8:
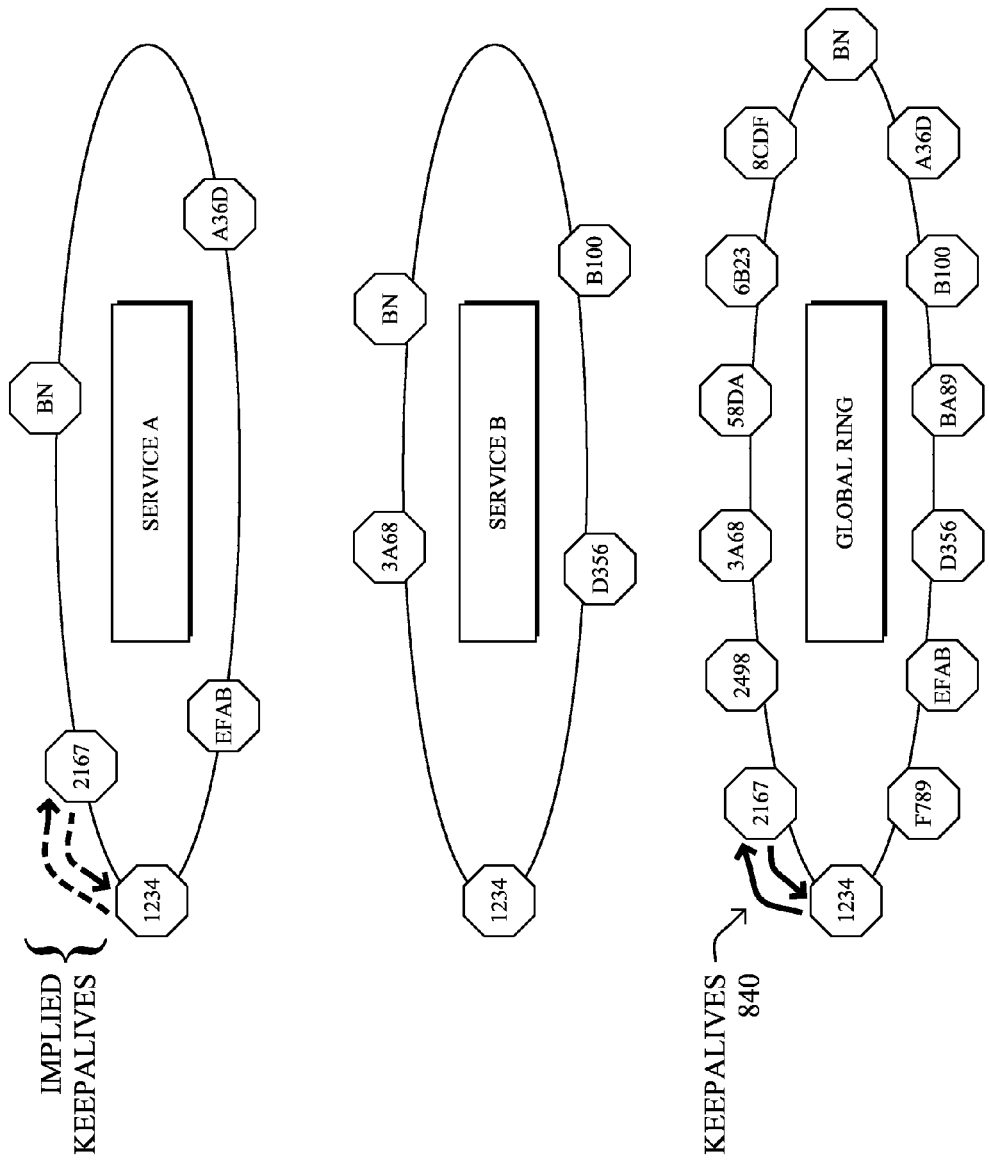
FIG. 8 illustrates an example of service-based sub-ring keepalive operation.

FIG. 8 illustrates an example of service-based sub-ring keepalive operation, where even though multiple rings are created, service-aware DHT routing need not send keepalive messages 840 to maintain each separate ring. Instead, each node in service-based DHT sub-rings is required to join the global ring 410 to eliminate the keepalive messaging that would have been sent for each separate ring 420. (Note that the global routing table, however, still contains more entries than a non-service aware DHT ring, as the neighbor selected after polling might not run all services that the node, e.g., node "1234" is subscribed to.)

Additionally, when a node leaves the global ring 410, the remaining nodes in the global ring 410 will remove the departing node from all rings (sub-rings 420 and the global ring 410) that the departing node participates in (i.e., that the departing node had joined). Note that determining whether a node leaves the global ring may be based on an explicit notification, or else in response to the absence of a keepalive message being received.

To illustrate service-aware DHT routing using service-based DHT sub-rings, the following use cases are presented as examples (and not by way of limitation):

1. A DHT network consists of two types of nodes: nodes that have persistent storage (e.g., disk nodes) and nodes that do not have persistent storage (e.g., diskless nodes). Evidently, diskless nodes can participate in GET operations, but not PUT operations. Administrators can configure diskless nodes as one service class and disk nodes as another service class, such that PUT operations will be routed to disk nodes only.
2. A content provider is using DHT to store movies, where the content provider has DHT nodes deployed in different parts of the globe. Ideally, the content provider wants to store different movies to the DHT nodes based on the region's movie-watching demographics (e.g., nationality, language, race, etc.) because that would allow for a higher probability of the GET operations. For example, Chinese movies are more likely to be watched in China than Mexico and Mexican movies are more likely to be watched in Mexico. So the content provider may want to identify the DHT nodes in China to store Chinese movies and nodes in Mexico to store Mexican movies. To accomplish this, Mexican movies may be assigned to one service class and Chinese movies may be assigned to another service class.

Notably, other use cases may be presented based on service-aware DHT routing, such as server capabilities, time zones, specific content, etc., and those described herein are merely examples.

Figure 9:
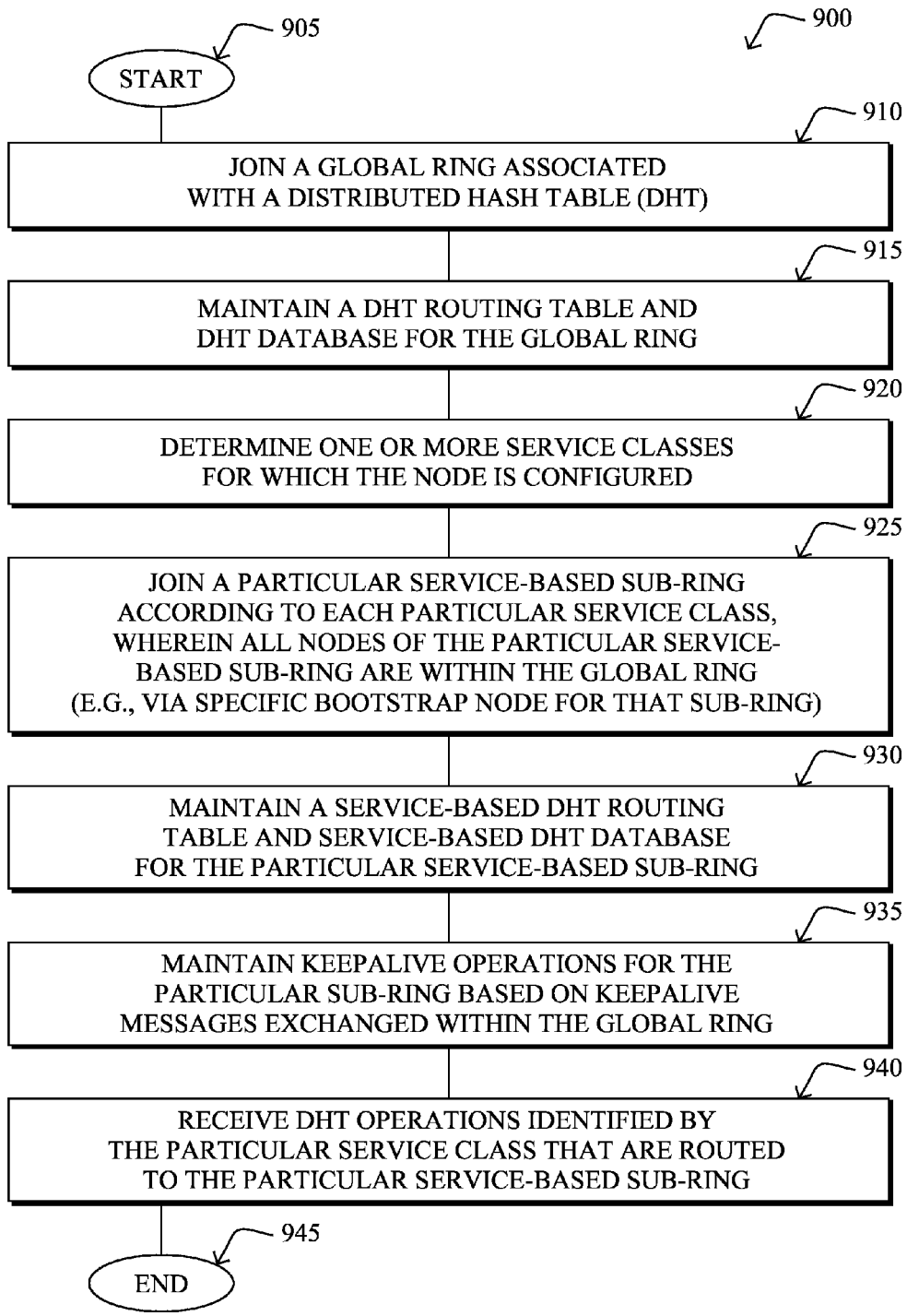
FIG. 9 illustrates an example simplified procedure for service-aware DHT routing in a computer network, particularly from the perspective of a node.

FIG. 9 illustrates an example simplified procedure 900 for service-aware DHT routing in a computer network in accordance with one or more embodiments described herein, particularly from the perspective of a node. The procedure 900 may start at step 905, and continues to step 910, where, as described in greater detail above, a node (e.g., 1234) joins a global ring 410 associated with a DHT (e.g., at a particular bootstrap node), where in step 915 the node also maintains a DHT routing table 415 and DHT database for the global ring. Additionally, in step 920, the node may determine (e.g., based on configuration) one or more service classes for which the node is configured, such that in step 925 the node may then join one or more corresponding service-based sub-rings 420 according to the particular service class(es). As noted above, all nodes of the particular service-based sub-ring(s) are within the global ring (e.g., via specific bootstrap node for that sub-ring). In step 930, the node maintains a service-based DHT routing table 425 and service-based DHT database for each of its joined service-based sub-rings 420.

The procedure 900 illustratively continues to step 935 where the node participates in maintenance of keepalive operations (maintaining a routing table) for the particular sub-ring(s) 420 based on keepalive messages exchanged within the global ring 410. In addition, in step 940, the node may receive DHT operations (e.g., PUT/GET) identified by the particular service class that are routed to a particular service-based sub-ring. The procedure 900 illustratively "ends" in step 945, however, the procedure may continue from any of the above steps to update service classes, join new service-based sub-rings, maintain keepalives, receive DHT operations, etc., and the view of procedure 900 is not meant to be limiting to the scope of the embodiments herein.

Figure 10:
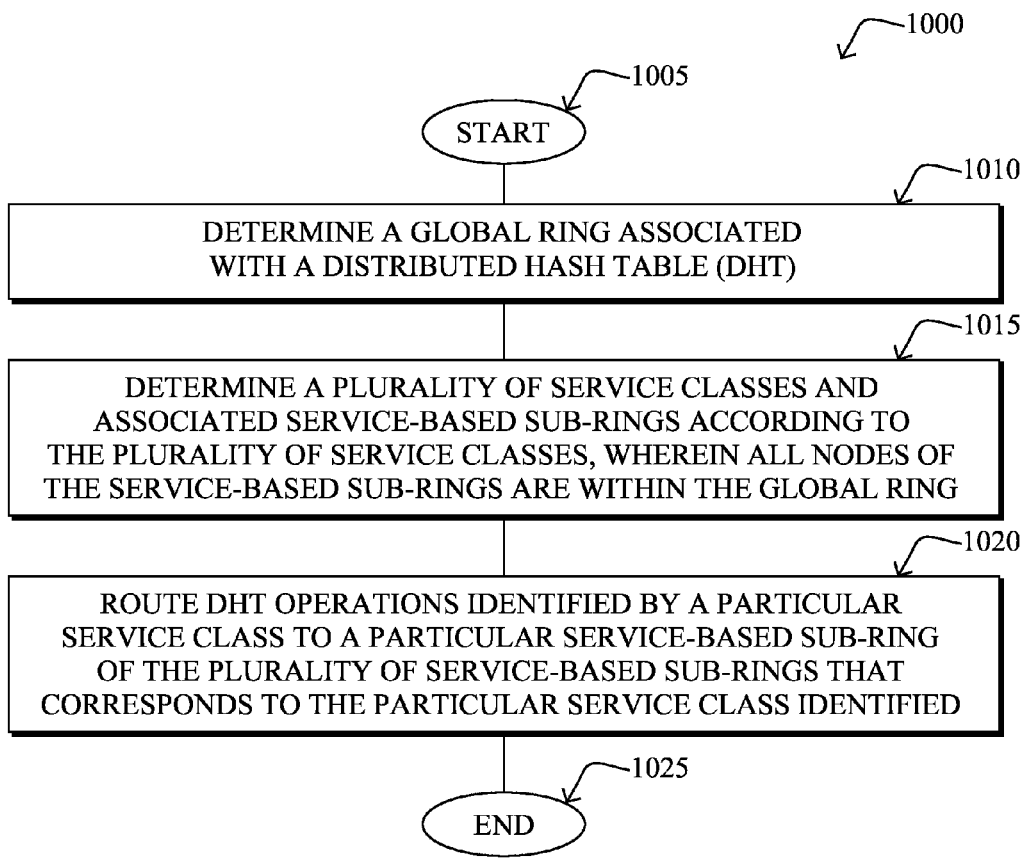
FIG. 10 illustrates another example simplified procedure for service-aware DHT routing in a computer network, particularly from the perspective of a portal node.

In addition, FIG. 10 illustrates another example simplified procedure 1000 for service-aware DHT routing in a computer network in accordance with one or more embodiments described herein, particularly from the perspective of a portal node 630. The procedure 1000 may start at step 1005, and continues to step 1010, where, as described in greater detail above, the portal node determines a global ring 410 associated with a DHT, and also becomes aware of at least one node within that global ring (e.g., if not participating in the ring itself). In addition, in step 1015, the portal node determines a plurality of service classes and associated service-based sub-rings 420 according to the plurality of service classes, where all nodes of the service-based sub-rings are within the global ring, as described above. Note that here the portal node also becomes aware of at least one node participating in each service-based sub-ring. According to portal node operation, in step 1020 the portal node routes incoming DHT operations (e.g., PUT/GET) identified by a particular service class to a particular service-based sub-ring of the plurality of service-based sub-rings that corresponds to the particular service class identified. The procedure 1000 illustratively ends in step 1025, though notably with the continued option of updating DHT memberships (nodes within the global ring and/or sub-rings), routing DHT operations, etc. Note also that in the event the portal node is also a node participating within the global ring and/or any sub-rings, the portal node may also operate according to procedure 900 in FIG. 9 above.

Figure 11:
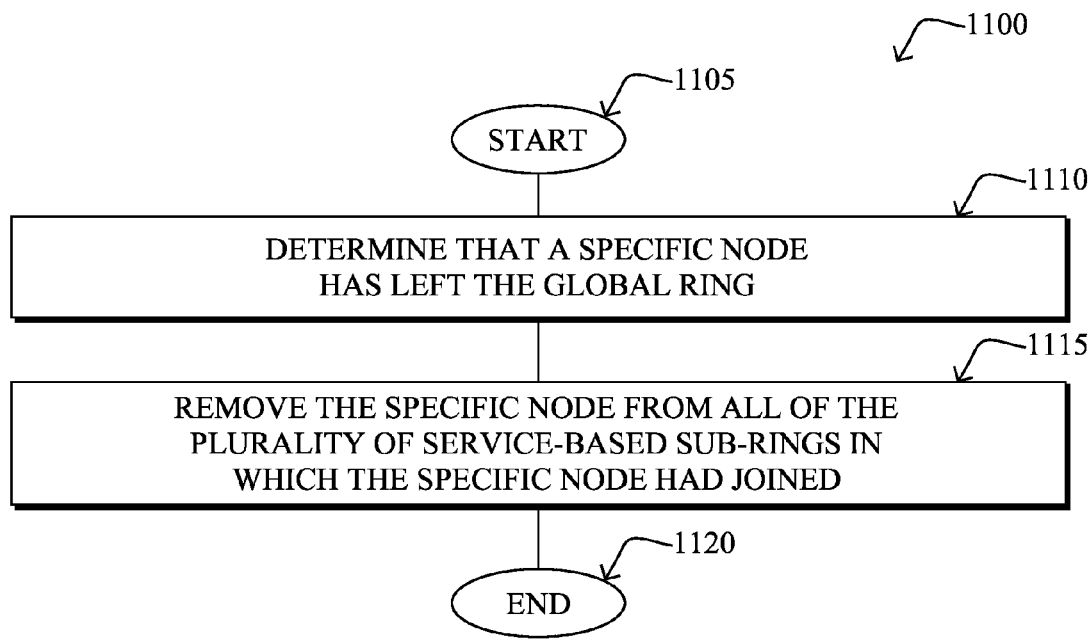
FIG. 11 illustrates still another example simplified procedure 1100 for service-aware DHT routing in a computer network in response to nodes leaving the global ring.

Lastly, FIG. 11 illustrates still another example simplified procedure 1100 for service-aware DHT routing in a computer network in response to nodes leaving the global ring. The procedure 1100 starts at step 1105, and continues to step 1110, where, as described in greater detail above, in response to determining that a specific node has left the global ring (e.g., explicitly leaving or not responding to a keepalive message), the node (DHT node) may remove the specific node in step 1115 from all of the plurality of service-based sub-rings in which the specific node had joined. The illustrative procedure 1100 then ends in step 1120, until another node leaves the global ring.

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The techniques described herein, therefore, provide for service-aware DHT routing in a computer network. In particular, by specifying which nodes handle a service level, and creating a separate DHT routing table for each service level, the techniques herein enable customers to build distributed database applications according to service level. That is, the techniques herein allow an administrator to define which nodes store which objects at each service level, taking into account the locality, network, and access pattern information, which conventional "flat" DHT does not provide. Also, since a dedicated ring is created to handle each service level, the PUT/GET latency will likely be reduced. Said differently, since DHT is service-aware, it is more efficient to store and locate objects by the service level as opposed to putting everything in one flat DHT ring.

Certain techniques currently available create a "namespace" for each service, and DHT nodes that support this service (run code for the service) register to this namespace, essentially creating a tree overlay on top of the single DHT ring. The maintenance of these trees incurs significant overhead as the keepalives must be done on a per-service level, i.e., a physical node registered for multiple service must exchange keepalives for each service. The techniques presented herein do not suffer this problem, as multiple logical rings are created and overlaid on top of the global DHT ring, and keepalives are only exchanged to maintain the global DHT ring. The currently available techniques also lack native support for per-hop operations, for example multicast, traceroute, etc., where every node in the message route has to perform some operation, i.e., because the DHT only performs route-to-key. The techniques herein, however, natively support per-hop operations because the message need only be routed over nodes that have registered for the service.

In addition, the techniques herein are superior to caching, as the techniques herein do not require additional disk space occupied by the cache. Caching may require management of stale cache entries. In addition, when compared with running multiple DHT instances, the techniques herein are generally more scalable, and do not require as much processing power as do multiple DHT instances. That is, multiple DHT instances would not scale well, as a DHT protocol would need to be extended for multiple instances in order to handle messages being received on different ports, and each instance would also have to send its own keepalives to maintain its routing table.

Moreover, the techniques herein offer advantages over hierarchical DHTs, as well. In particular, hierarchical DHTs use a series of complete rings (complete key space, i.e., each key can exist in only one ring) that are interconnected together in a logical hierarchy. For example, hierarchical DHT are used for interconnecting multiple DHT rings, referred to as domains, to provide better fault isolation and security. Each domain may also be placed under different administrative control. Each leaf level manages a domain at the bottom of a tree in the hierarchy, and each level higher up in the tree handles groups of domains by merging all the domains underneath. The top level domain, referred to as universal domain, consists of all domains.

The primary use of hierarchical DHTs, however, is to merge multiple flat DHTs to form a universal DHT (inter-provider peering) such that objects placed in one domain are available to other domains. Access to objects across domains is via proxy or gateway nodes. However, the use of hierarchical DHTs is different from service-aware DHTs as described herein. For instance, the techniques herein are directed toward applications, providing a manner in which a common DHT routing platform may be shared while allowing application-specific functionality to reside only on certain nodes. In hierarchical DHT construction, however, a leaf node belongs to only one domain. Thus, if a physical node runs multiple applications and a domain corresponds to a service (application), the DHT node must be a logical node and multiple logical nodes would reside on a physical DHT node. While virtual nodes are a useful technique for heterogeneous DHTs, they are unsuited for the purpose of constructing service-domains. For instance, in an enterprise DHT, a physical node might run tens or hundreds of applications and the volume of control messaging needed for maintaining virtual nodes for each application would be infeasible. Moreover, as a tradeoff to achieve advantages of hierarchical DHTs, the latency of GETs for objects increases exponentially the higher up in a hierarchy the GET propagates. The construction of service-aware DHTs as described herein, on the other hand, does not suffer from this issue as it relies on the service-class/service-domain to direct the GET to the appropriate logical ring (sub-ring).

While there have been shown and described illustrative embodiments that provide for service-aware DHT routing, it is to be understood that various other adaptations and modifications may be made within the spirit and scope of the embodiments herein. In particular, the description above generally references behavior similar to Pastry-like DHT protocols. However, the embodiments are not so limited, and apply to any suitable DHT protocol. In addition, while the embodiments above illustrate certain types of services or scenarios where services may be particularly applicable, such discussion is meant to be merely an example, and also not limiting to the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   joining, by a node in a computer network, a global ring associated with a distributed hash table (DHT);
   maintaining a DHT routing table and a DHT database for the global ring;
   determining a particular service class for which the node is configured;
   joining a particular service-based sub-ring according to the particular service class, wherein all nodes of the particular service-based sub-ring are within the global ring;
   maintaining a service-based DHT routing table and a service-based DHT database for the particular service-based sub-ring, wherein DHT operations identified by the particular service class are routed to the particular service-based sub-ring;
   exchanging keepalives with neighbors in the DHT routing table associated with the global ring; and
   maintaining the service based DHT routing table for the particular service based sub-ring based on the keepalive messages exchanged between the neighbors in the DHT routing table associated with the global ring, wherein no keepalives are sent between neighbors of the service-based DHT.

2. The method as in claim 1, wherein there are a plurality of service-based sub-rings associated with the global ring, wherein each node of each of the plurality of service-based sub-rings is within the global ring.

3. The method as in claim 2, wherein one or more specific nodes within the global ring are not within any of the plurality of service-based sub-rings.

4. The method as in claim 1, further comprising:
   determining a plurality of service classes for which the node is configured;
   joining a plurality of service-based sub-rings according to the plurality of service classes; and
   maintaining a separate service-based DHT routing table and separate service-based DHT database for each of the plurality of service-based sub-rings.

5. The method as in claim 1, wherein service classes are at least one of: node type, node capability, node location, node functionality and node applications.

6. The method as in claim 1, wherein joining the service-based sub-ring comprises:
joining the service-based sub-ring via a specific bootstrap node for that service-based sub-ring.

7. A method, comprising:
determining, by a portal node in a computer network, a global ring associated with a distributed hash table (DHT), wherein a DHT routing table and a DHT database are maintained for the global ring;
determining a plurality of service classes and associated service-based sub-rings according to the plurality of service classes, wherein all nodes of the service-based sub-rings are within the global ring;
routing DHT operations identified by a particular service class to a particular service-based sub-ring of the plurality of service-based sub-rings that corresponds to the particular service class identified, wherein a service-based DHT routing table and a service-based DHT database is maintained for the particular service-based sub-ring,
wherein keepalives are exchanged with neighbors in the DHT routing table associated with the global ring, and the service based DHT routing table for the particular service based sub-ring is maintained based on the keepalive messages exchanged between the neighbors in the DHT routing table associated with the global ring,
wherein no keepalives are sent between neighbors of the service-based DHT.

8. The method as in claim 7, further comprising:
determining that a specific node has left the global ring; and, in response,
removing the specific node from all of the plurality of service-based sub-rings in which the specific node had joined.

9. The method as in claim 7, wherein one or more specific nodes within the global ring are not within any of the plurality of service-based sub-rings.

10. The method as in claim 7, wherein service classes are at least one of: node type, node capability, node location, node functionality and node applications.

11. The method as in claim 7, wherein the portal node is a node participating within the global ring.

12. An apparatus, comprising:
a network interface to communicate within a computer network as a node;
a processor coupled to the network interface and adapted to execute one or more processes; and
a memory configured to store a process executable by the processor, the process when executed operable to:
join a global ring associated with a distributed hash table (DHT);
maintain a DHT routing table and a DHT database for the global ring;
determine a particular service class for which the node is configured;
join a particular service-based sub-ring according to the particular service class, wherein all nodes of the particular service-based sub-ring are within the global ring;
maintain a service-based DHT routing table and a service-based DHT database for the particular service-based sub-ring, wherein DHT operations identified by the particular service class are routed to the particular service-based sub-ring;
exchanging keepalives with neighbors in the DHT routing table associated with the global ring; and
maintaining the service based DHT routing table for the particular service based sub-ring based on keepalive messages exchanged between the neighbors in the DHT routing table associated with the global ring, wherein no keepalives are sent between neighbors of the service-based DHT.

13. The apparatus as in claim 12, wherein the process when executed is further operable to:
determine a plurality of service classes for which the node is configured;
join a plurality of service-based sub-rings according to the plurality of service classes; and
maintain a separate service-based DHT routing table and separate service-based DHT database for each of the plurality of service-based sub-rings.

14. An apparatus, comprising:
a network interface to communicate within a computer network as a portal node;
a processor coupled to the network interface and adapted to execute one or more processes; and
a memory configured to store a process executable by the processor, the process when executed operable to:
determine a global ring associated with a distributed hash table (DHT), wherein a DHT routing table and a DHT database are maintained for the global ring;
determine a plurality of service classes and associated service-based sub-rings according to the plurality of service classes, wherein all nodes of the service-based sub-rings are within the global ring;
route DHT operations identified by a particular service class to a particular service-based sub-ring of the plurality of service-based sub-rings that corresponds to the particular service class identified, wherein a service-based DHT routing table and a service-based DHT database is maintained for the particular service-based sub-ring,
wherein keepalives are exchanged with neighbors in the DHT routing table associated with the global ring, and the service based DHT routing table for the particular service based sub-ring is maintained based on the keepalive messages exchanged between the neighbors in the DHT routing table associated with the global ring,
wherein no keepalives are sent between neighbors of the service-based DHT.

15. The apparatus as in claim 14, wherein the process when executed is further operable to:
determine that a specific node has left the global ring; and, in response,
remove the specific node from all of the plurality of service-based sub-rings in which the specific node had joined.

16. The apparatus as in claim 14, wherein the portal node is a node participating within the global ring.

17. The apparatus as in claim 12, wherein service classes are at least one of: node type, node capability, node location, node functionality and node applications.

18. The apparatus as in claim 12, wherein there are a plurality of service-based sub-rings associated with the global ring, wherein each node of each of the plurality of service-based sub-rings is within the global ring.

19. The apparatus as in claim 14, wherein service classes are at least one of: node type, node capability, node location, node functionality and node applications.

20. The apparatus as in claim 14, wherein there are a plurality of service-based sub-rings associated with the global ring, wherein each node of each of the plurality of service-based sub-rings is within the global ring.

* * * * *